United States Patent Office 2,726,342
Patented Dec. 6, 1955

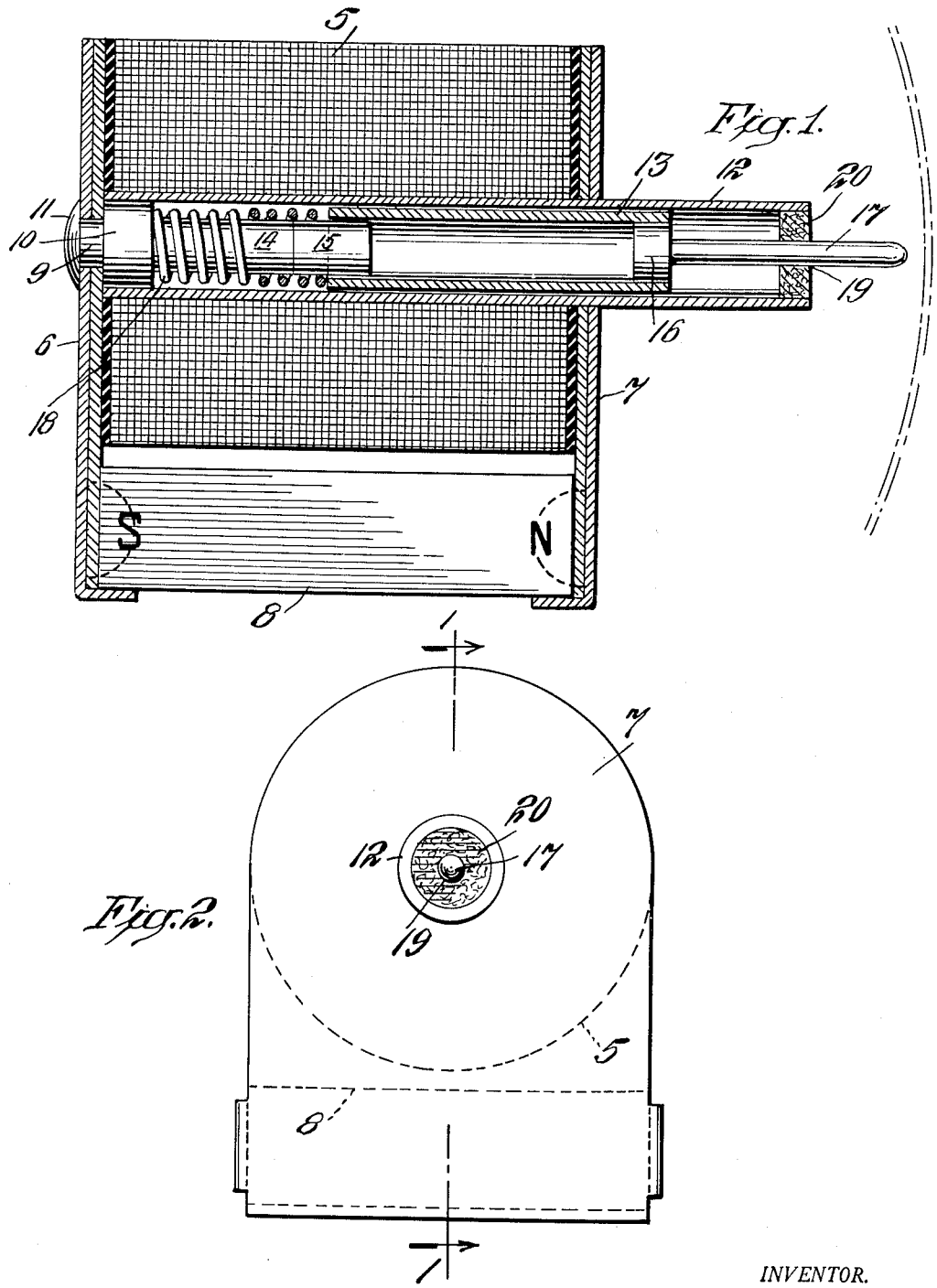

2,726,342

ALTERNATING CURRENT VIBRATING BELL

Howard L. Caretto, Brooklyn, N. Y., assignor to The Reeve Electrical Co., Inc., New York, N. Y., a corporation of New York Application January 13, 1955, Serial No. 481,557

5 Claims. (Cl. 310—30)

The invention disclosed in this patent is an alternating current bell of the vibrating type.

Objects of the invention are to provide a reciprocating motor unit for such bells or other devices which will be positive and powerful in its action and which can be made up of few parts compactly arranged, readily assembled and secured in their proper relation practically or almost entirely by the act of assembly.

Further special objects of the invention are to provide a reciprocating bell type unit of the character indicated which can be produced at low cost and which can be relied on to continue in service over long periods of time and under adverse circumstances.

The foregoing and other desirable objects are attained by novel features of construction, combinations and relations of parts, all as hereinafter set forth and illustrated by way of example in the accompanying drawing.

In the drawing referred to a simple practical embodiment of the invention is shown, but it will be appreciated that changes and modifications may be made therein, all within the true intent and scope of the invention as hereinafter disclosed and claimed.

Fig. 1 in the drawing is a broken vertical sectional view of one of the motor units with parts appearing as on section line 1—1 of Fig. 2;

Fig. 2 is an end elevation of the unit.

Fig. 1 shows the unit as made up of a single solenoid winding 5 enclosed between polar extensions 6 and 7 of a permanent bar magnet 8 located in parallel relation at one side of the coil.

The two plates composing the polar extension 6 are shown as riveted together by a stud 9 of magnetic material having a head enlargement 10 at the inner face of the polar plates and headed over the outer plate at 11.

A tube 12 of brass or other non-magnetic material is shown driven over the head enlargement 10 of the stud, thus to fixedly locate and support this tube as a guide for the reciprocating core 13 of the solenoid.

The latter is shown as a tube or sleeve of magnetic material of a size to slide freely within the guide tube, open at the inner end to slide freely over the extended guide portions 14, 15 of the stud and closed at the outer end by a plug 16 integral with or carrying a projecting striker pin 17 of Phosphor bronze or the like.

The main portion 14 of the guide stud is of magnetic material and the end or tip portion 15 of the same is of non-magnetic material such as Phosphor bronze.

A spring 18 surrounding the guide stud and engaging the end of the hollow core holds the latter balanced away from the end of the magnetic portion 14 of the guide stud, thus providing a magnetic gap between the end of the core and the magnetic end of the stud.

The spring 18 may be of steel to serve as a flux guiding or flux reinforcing element between the guide stud and core, said spring shown as in abutment at one end with the shoulder provided by the rivet head or enlargement 10 of the stud and in engagement at the opposite end with the end of the tubular core.

The inner end of the hollow core is in effect yieldingly floated in guided position over the non-magnetic end of the guide stud.

The outer end of the core is guided, in the disclosure, by having the striker pin extension 17 slidingly operating in a bearing opening 19 in a felt washer or plug 20 fixed in the outer, projecting end of the guide tube 12.

The member 20 may be impregnated, compacted or compressed felt impervious to dust, moisture, vermin, etc.

The second pair of pole plates 7 may be secured by press fit engagement over the extended portion of the guide tube and, if desired, lugs may be extended from the pole plates over the ends of the permanent magnet, or other means be provided for fixing the parts in their assembled relation.

The invention provides a motor unit consisting of but few parts and these all of simple design. The parts are held together magnetically and mechanically by the act of assembling them. The moving parts are enclosed and protected and permanent lubrication is provided for the mechanically supported end of the solenoid core. The floating support for the inner end of the core and the resilient sliding support for the outer end of the core enable the unit to operate with equal efficiency in any position, while affording desirable freedom of operation and the sealing of operating parts against effects of moisture, dust and insect invasion.

The construction illustrated has advantages in that the core 13 may be made from a cut length of magnetic tubing. It is contemplated that the core may be a solid bar or rod or be solid and bored at one end to guide over the post, and it is also considered that a guide tip 15 of non-magnetic material may be omitted, the patent covering these and other possible variations of the invention.

What is claimed is:

1. An alternating current vibrating bell motor comprising a straight bar permanent magnet, parallel polar extensions engaged over the ends of said permanent magnet, a magnetic guide post fixed to the inner face of one of the polar extensions projecting toward the other polar extension and terminating in a non-magnetic guide tip, a non-magnetic guide tube engaged over said guide post and projecting from the first mentioned polar extension through the other polar extension, a tubular magnetic core freely operable in the guide tube and having an inner, open end operable over the non-magnetic tip portion of the guide post and a non-magnetic striker pin projecting from the outer end of the core, a felt bearing washer fixed in the guide tube and slidingly supporting said striker pin, a spring within a guide tube in engagement with the inner end of the tubular core and a solenoid winding about the guide tube between said polar extensions.

2. The invention according to claim 1, in which the guide post has a reduced portion extended through and riveted over the first polar extension and an enlarged head at the inner face of that polar extension over which the inner end of the guide tube is fixed and said head providing a shoulder engaged by said core positioning spring.

3. The invention according to claim 1, in which the felt bearing is compacted and impregnated with a medium rendering it impervious to moisture, dust and vermin.

4. Bell motor comprising a solenoid coil, pole pieces over opposite ends of said coil, a magnetic post at the center of said coil having an enlarged base portion fixed over the inner face of one pole piece, a reduced portion projecting from said base portion toward the other pole piece and an annular shoulder at the junction of said reduced portion with the enlarged base portion, a non-magnetic tube fixedly engaged over said enlarged base portion and projecting clear of the reduced portion through and beyond the other pole piece, a magnetic core operable in said tube substantially free of contact therewith, a coil spring loosely surrounding said reduced portion of the post and engaged at one end with said annular shoulder and at the opposite end with the inner end of the magnetic core, a reduced striker extension projecting from the outer end of the core beyond the projecting outer end of the tube and a felt bearing washer impervious to moisture, dust and vermin fixed in the projecting outer end of the tube and having a bearing opening therethrough slidingly receiving and guiding said reduced striker extension of the magnetic core and thereby mechanically guiding the outer end of the core and the inner end of the core being yieldingly floated by the spring free of contact with the surrounding tube and whereby said core is supported and guided at both ends substantially free of rubbing engagement with the surrounding tube.

5. The invention according to claim 4, in which the magnetic core is in the form of a magnetic tube extending freely over the reduced portion of the post.

References Cited in the file of this patent

UNITED STATES PATENTS

| | | |
|---|---|---|
| 818,589 | Wegner | Apr. 24, 1906 |
| 2,561,355 | Fish | July 24, 1951 |

FOREIGN PATENTS

| | | |
|---|---|---|
| 657,789 | Germany | Mar. 12, 1938 |